(12) United States Patent
Yost

(10) Patent No.: US 8,498,827 B2
(45) Date of Patent: Jul. 30, 2013

(54) COMBINING REDUNDANT INERTIAL SENSORS TO CREATE A VIRTUAL SENSOR OUTPUT

(75) Inventor: Paul W. Yost, Portsmouth, OH (US)

(73) Assignee: YEI Corporation, Portsmouth, OH (US)

(*) Notice: Subject to any disclaimer, the term of this patent is extended or adjusted under 35 U.S.C. 154(b) by 0 days.

(21) Appl. No.: 13/408,325

(22) Filed: Feb. 29, 2012

(65) Prior Publication Data

US 2012/0166134 A1 Jun. 28, 2012

Related U.S. Application Data

(60) Division of application No. 13/040,677, filed on Mar. 4, 2011, which is a continuation of application No. PCT/IB2010/003510, filed on Nov. 24, 2010.

(60) Provisional application No. 61/264,006, filed on Nov. 24, 2009.

(51) Int. Cl.
  *G01L 1/00* (2006.01)
(52) U.S. Cl.
  USPC .................................................. 702/41
(58) Field of Classification Search
  USPC .................. 702/41; 701/3; 714/800
  See application file for complete search history.

(56) References Cited

U.S. PATENT DOCUMENTS

| | | | |
|---|---|---|---|
| 4,825,716 A | 5/1989 | Roberts et al. | |
| 5,272,922 A | 12/1993 | Watson | |
| 6,148,271 A | 11/2000 | Marinelli | |
| 6,257,057 B1 | 7/2001 | Hulsing | |
| 6,882,964 B2 | 4/2005 | Bayard et al. | |
| 7,036,373 B2 | 5/2006 | Johnson et al. | |
| 7,040,164 B2 | 5/2006 | Painter et al. | |
| 7,227,432 B2 | 6/2007 | Lutz et al. | |
| 7,267,005 B1 | 9/2007 | Kranz et al. | |
| 7,617,728 B2 | 11/2009 | Cardarelli | |
| 7,636,373 B2 | 12/2009 | Binder | |
| 7,937,190 B2 * | 5/2011 | Stecko et al. ............ 701/3 |
| 8,122,333 B2 * | 2/2012 | Shim et al. ............ 714/800 |

(Continued)

FOREIGN PATENT DOCUMENTS

WO 2007050163 5/2007

OTHER PUBLICATIONS

Honglong Change, Liang Xue, Wei Qin, Guangmin Yuan and Weizheng Yuan; An Integrated MEMS Gyroscope Array with High Accuracy Output; Sensors 2008; vol. 8, pp. 2886-2899.

PCT International Search Report and Written Opinion of the International Searching Authority; PCT/IB2010/003510; filed Nov. 24, 2010.

(Continued)

*Primary Examiner* — Tung S Lau
*Assistant Examiner* — Xiuquin Sun
(74) *Attorney, Agent, or Firm* — Dinsmore & Shohl LLP

(57) ABSTRACT

Included are embodiments for determining an inertial quantity. One embodiment of a method includes combining readings from a plurality of inertial sensors to produce an estimate of the value of an inertial quantity in a manner that is fault-tolerant, more accurate than traditional sensor arrangements, and able to handle non-linear and non-Gaussian systems. Embodiments of a method also include utilizing a Monte Carlo estimation-based inference system to adaptively combine the inertial sensor outputs into a fault-tolerant highly-accurate inertial quantity estimate, an axis-reversed-paired physical arrangement of inertial sensors to minimize effects of environmental and process noise, and cross-associating sensors to ensure good sensor associations and reduce the effects of sample impoverishment.

10 Claims, 11 Drawing Sheets

U.S. PATENT DOCUMENTS

| | | |
|---|---|---|
| 2003/0187623 A1 | 10/2003 | Bayard et al. |
| 2006/0032308 A1 | 2/2006 | Acar et al. |
| 2006/0169041 A1 | 8/2006 | Madni et al. |
| 2006/0169042 A1 | 8/2006 | Hulsing |
| 2007/0032951 A1 | 2/2007 | Tanenhaus et al. |
| 2009/0204031 A1 | 8/2009 | McNames et al. |

OTHER PUBLICATIONS

Office Action pertaining to U.S. Appl. No. 13/040,677 dated Apr. 13, 2012.

Elections/Restrictions Requirement pertaining to U.S. Appl. No. 13/040,677 dated Feb. 3, 2012.

* cited by examiner

COMBINING REDUNDANT INERTIAL SENSORS TO CREATE A VIRTUAL SENSOR OUTPUT

CROSS REFERENCE

This application is a divisional of U.S. patent application Ser. No. 13/040,677 filed Mar. 4, 2011 and claims the benefit of PCT/IB2010/003510, filed Nov. 24, 2010, which claims priority to U.S. Provisional Application No. 61/264,006, filed Nov. 24, 2009.

BACKGROUND OF THE INVENTION

1. Field of the Invention

The invention relates to the field of inertial sensors and instrumentation, and in particular to the processing of redundant inertial sensor data to improve accuracy, using a Monte Carlo estimation-based inference system applicable to estimating linear, non-linear, Gaussian and non-Gaussian systems.

2. Background

The inertial measurement unit (IMU) is a critical component for a wide range of applications ranging from aerospace and missile guidance systems, to robotics and navigation systems, to interactive games and simulations. IMU systems incorporate angular rate sensors as a system-critical component that detects changes in the orientation of the system. Gyroscopic sensor system performance is generally dominated by two critical performance characteristics: bias drift and noise components. These include inaccuracies induced by sources such as bias drift, rate random walk, angular random walk, process noise, measurement noise, thermal noise, and even sensor failure.

Recently, gyroscopic rate sensors enabled by micro-electro-mechanical systems (MEMS) technologies have produced revolutionary reductions in size, cost, and power consumption over traditional electro-optical and electro-mechanical systems. Additionally, since MEMS-based systems are packaged as and used in production as any other semiconductor device, final integrated systems can be more rugged and more easily mass produced. Despite these tremendous advantages however, current state-of-the-art MEMS rate sensors cannot compete with traditional non-MEMS gyroscopic systems with respect to bias drift and noise rejection.

Bias drift, the tendency to lose position over time, is a pervasive problem within MEMS products that must be avoided or controlled at the component level and/or at the control/algorithmic level. MEMS components are subject to drift due to surface charging in some cases, and most commonly due to stress on and within the MEMS units. As the units are put under temperature pressure, physical stress, and other environmental factors, stresses between the materials in the MEMS units create signals that look similar to an electrical velocity or acceleration signal, thus causing integrative inertial calculations to drift. Traditionally, developers have opted for larger units, additional packaging layers, tight temperature control, and filtering to reduce bias drift.

Noise, resulting from a number of physical phenomena, generally exhibits random properties that are difficult to compensate for via packaging or filtering approaches. These random noise effects, classified as angular random walk, rate random walk, and angular white noise, are, by nature, unpredictable and therefore difficult to counteract. With a single sensor configuration, differentiating noise from inertial rate becomes a daunting task, especially in MEMS systems which, due to their micro-electro-mechanical structure, have significant process noise magnitudes. Understanding and characterizing these process noise components can be useful in calculating sensor reading confidence intervals, but can do little to eliminate or counteract the noise since in single sensor systems there is no additional frame of reference by which noise can be cross-correlated.

Thus, gyroscopic rate sensor systems can be mechanical, electro-optical, or MEMS. While traditional electro-mechanical and electro-optical systems can be made to exhibit environmental noise rejection and low bias drift characteristics, they are, by nature, larger and thus more difficult to adapt to applications where small size and/or low-power requirements are important concerns. Recent efforts have focused upon using MEMS sensors that, while resulting in smaller sizes and lower power requirements, have not resulted in desired environmental noise rejection or low-drift characteristics.

BRIEF SUMMARY OF THE INVENTION

This invention uses a novel sensor arrangement and algorithmic solution that results in small size, low power, and ease of fabrication requirements characteristic of MEMS approaches, coupled with performance characteristics comparable with non-MEMS systems. Specifically, this method uses a geometric arrangement of inertial sensors and an algorithmic approach to correlate and combine the outputs of a plurality of inertial sensor devices using a dynamic probability-based filtering system approach to sensor fusion. This approach provides for redundancies which result in a more robust, fault-tolerant system. These methods could be applied to any sensor array where higher-grade performance characteristics are desired.

The invention claims a systematic process by which the data from a set of inertial sensor devices may be combined into a virtual sensor output value by way of the application of a Monte Carlo estimation-based inference system. The preferred embodiment may be an Unscented Particle Filter wherein a set of particles, objects with positions chosen probabilistically to represent sensor variance and output values, have their positions altered by adding noise to them based on the noise characteristics of the sensor devices being used. Each particle's position is further updated by way of being predicted by an Unscented Kalman filter. A weight is then assigned to each particle based on the probability of the sensor data given each particle's position. The weights of all particles are then normalized with respect to the total of all particle weights. New particles are formed with positions obtained from the current set of particles, with more new particles obtaining their positions from current particles with higher weights than those with lower weights. The average of these new particle positions is computed and output as the current estimate of the actual inertial quantity. The new particle set is then made the current particle set. This process then repeats.

The system may also utilize one or more estimation systems such as an Ensemble Kalman Filter, Particle Filter, Sampling Importance Resampling Filter, Auxiliary Particle Filter, Extended Kalman Particle Filter, Markov Chain Monte Carlo, Condensation Particle Filter algorithm or other probability-based estimation systems. The method may be dynamically selected from a set of Monte Carlo estimation-based inference systems based on a set of operating and desired performance characteristic criteria, such as algorithmic execution time or accuracy.

The invention further claims a method by which to place single- or multiple-axis inertial sensors (such as gyroscopes, non-gyroscopic rate sensors, and accelerometers) such that the placement will result in sensor pairs which have their axes reversed with respect to each other, comprising placing the sensors on a substrate such that each axis on one sensor will be inverted with respect to the corresponding axis on the other sensor. This method may be applied to an array of inertial sensor pairs.

The method may include a plurality of virtual inertial sensors consisting of combining a set of inertial sensor devices in a plurality of inertial sensor devices with other inertial sensor devices in the plurality of inertial sensor devices, yielding up to $2^N$ virtual sensors from a set of N sensor devices. These virtual sensors can exhibit a greater range of operating and/or performance characteristics from which to take readings, and the data from the virtual sensors may be combined into a virtual sensor output value. Additionally, virtual sensors may be selected and their data used dynamically based on a set of operating and performance characteristic criteria, such as power draw or level of accuracy needed.

The system may be composed of MEMS or non-MEMS inertial sensor devices, processors, and other electronic hardware components, and the process may be performed by software controlled computers, firmware controlled digital processors, logic circuits, analog circuits, and application-specific integrated circuits. Furthermore, each inertial sensor device may have one or more measurement axes.

BRIEF DESCRIPTION OF THE DRAWINGS

FIG. 1B depicts an embodiment placing single-axis inertial sensor devices such that they are axis-reversed, as viewed from side-on.

FIG. 2B depicts an embodiment of axis-reversed inertial sensor devices placed in an array, as viewed from side-on.

The invention and its various embodiments may be better understood by the following detailed descriptions of the preferred embodiments which are presented as examples of the invention defined in the claims. It is understood that the invention as defined by the claims may be broader than the illustrated embodiments described below.

DETAILED DESCRIPTION OF THE PREFERRED EMBODIMENTS

This document is to be understood as defining not only a set of processes and sensor device configurations which will achieve our stated purpose, but also a physical system that may perform this process and contain sensor devices in the given configurations. The system may be composed of MEMS or non-MEMS inertial sensor devices, processors, and other electronic hardware components, and the process may be performed by software controlled computers, firmware controlled digital processors, logic circuits, analog circuits, and application-specific integrated circuits. Furthermore, each inertial sensor device may have one or more measurement axes.

Figure 6:
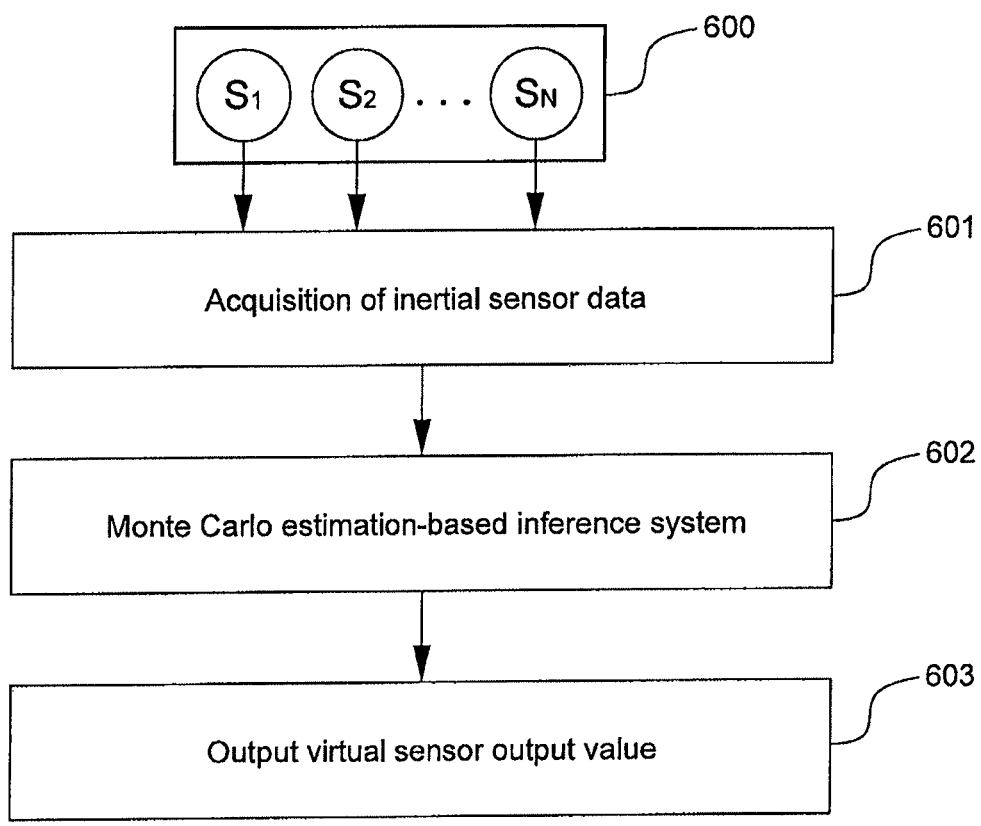
FIG. 6 depicts a flowchart of an embodiment of the use of a Monte Carlo estimation-based inference system to produce a virtual sensor output value from an array of inertial sensor devices.

FIG. 6 depicts a method of acquiring inertial sensor data 601 from an array of inertial sensor devices 600, combining the inertial sensor data utilizing a Monte Carlo estimation-based inference system 602, and outputting a virtual sensor output value 603 that estimates an inertial quantity in a manner that is fault-tolerant, more accurate than traditional sensor device arrangements, and able to handle non-linear and non-Gaussian systems. The use of a Monte Carlo estimation-based inference system adaptively combines the inertial sensor data into a fault-tolerant highly-accurate inertial quantity estimate.

Further, an axis-reversed-paired physical arrangement of inertial sensors minimizes the effects of environmental and process noise, and a method of cross-associating pairings ensures good sensor pairings and reduces the effects of sample impoverishment. The design achieves ultra-low drift and high noise rejection characteristics in four ways, resulting in a stable IMU.

Sensor Configuration

Figure 1A:
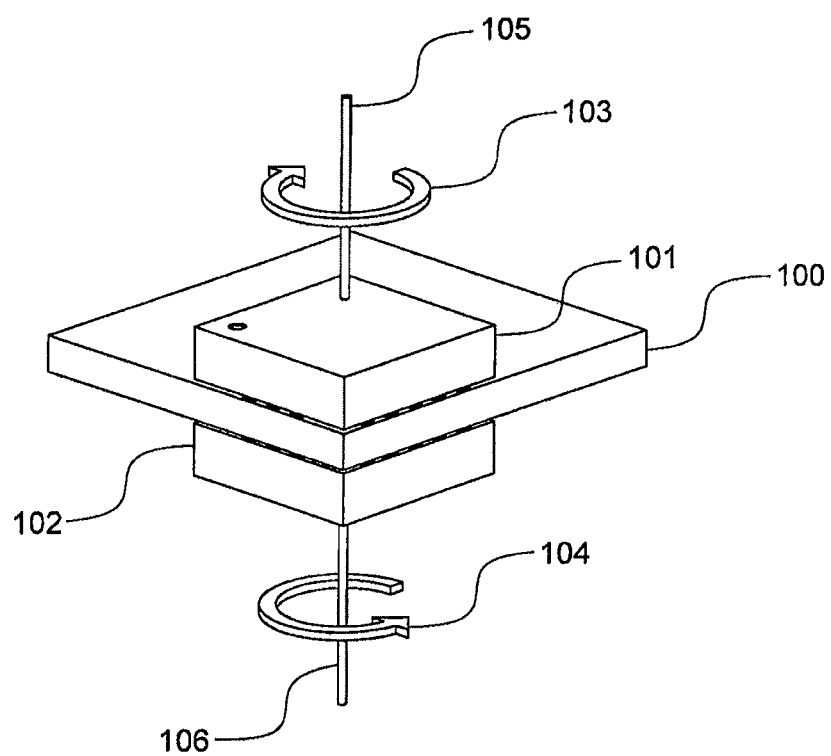
FIG. 1A depicts an embodiment placing single-axis inertial sensor devices such that they are axis-reversed, as viewed from an angle.
Figure 1B:
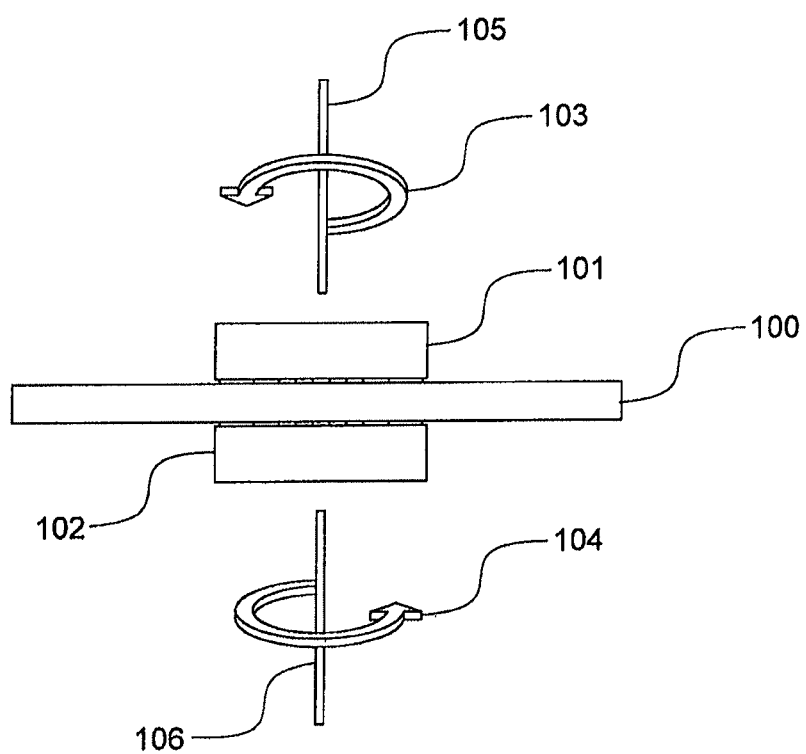

Inertial sensor devices will be mounted in an axis-reversed configuration that will allow differential measurement to take place. FIG. 1A and FIG. 1B depict a mounting of 1-axis angular rate sensors that achieves axis reversal. FIG. 1A is a view of the system at an angle, and 1B is a lateral view of the system. As illustrated, inertial sensor device 101 is mounted to a substrate 100, with an axis of sensitivity indicated by 105 which has a positive direction of sensitivity indicated by 103. A second inertial sensor device 102 is also mounted to the substrate 100, in such a way that its axis of sensitivity indicated by 106 opposes axis 105, causing its positive direction of sensitivity indicated by 104 to oppose direction 103.

Figure 1C:
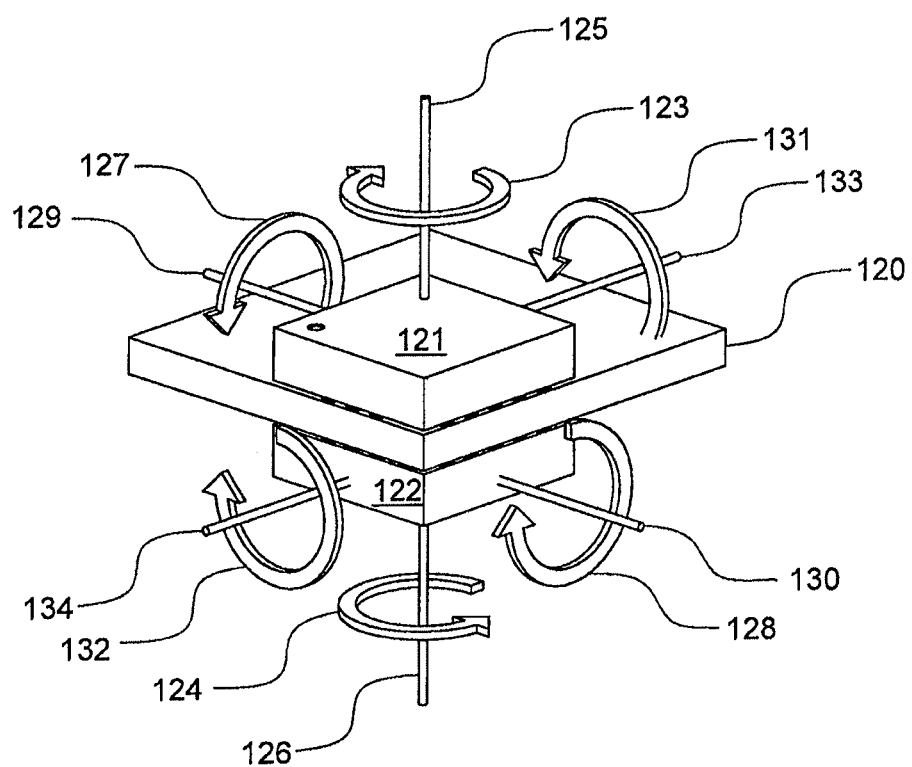
FIG. 1C depicts an embodiment placing three-axis inertial sensor devices such that they are axis-reversed, as viewed from an angle.

Similarly, FIG. 1C depicts a system that includes 3-axis angular rate sensors. As illustrated in FIG. 1C, a first inertial sensor device 121 is mounted to a substrate 120, with a first axis of sensitivity indicated by 125 which has a positive direction of sensitivity indicated by 123. The first inertial sensor device 121 also has a second axis of sensitivity indicated by 129 which has a positive direction of sensitivity indicated by 127. Additionally, the first inertial sensor device 121 has a third axis of sensitivity indicated by 133 which has a positive direction of sensitivity indicated by 131. A second inertial sensor device 122 is also mounted to the substrate 120, in such a way that its first axis of sensitivity indicated by 126 opposes axis 125, causing its positive direction of sensitivity as indicated by 124 to oppose direction 123. The second inertial sensor device 122 has a second axis of sensitivity indicated by 130 that opposes axis 129, causing its positive direction of sensitivity indicated by 128 to oppose direction 127. The second inertial sensor device 122 also has a third axis of sensitivity indicated by 134 that opposes axis 133, causing its positive direction of sensitivity indicated by 132 to oppose direction 131. Within any axis-reversed pair, each sensor device will experience inertial events of equal, but opposite magnitudes. Thus, the difference between inertial sensor devices in a pair becomes a virtual sensor that exhibits a natural cancellation of non-inertially induced signals such as thermally induced offset drift, RFI induced measurement noise, and vibration-induced measurement noise.

Sensor Array

Figure 2A:
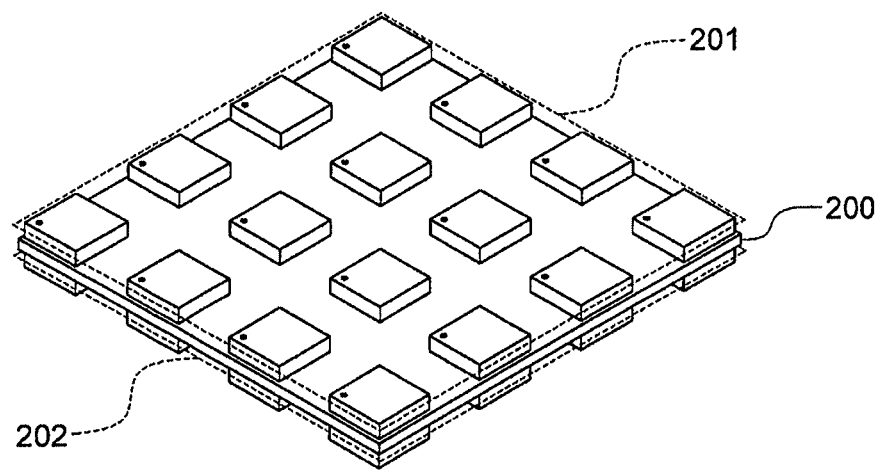
FIG. 2A depicts an embodiment of axis-reversed inertial sensor devices placed in an array, as viewed from an angle.
Figure 2B:
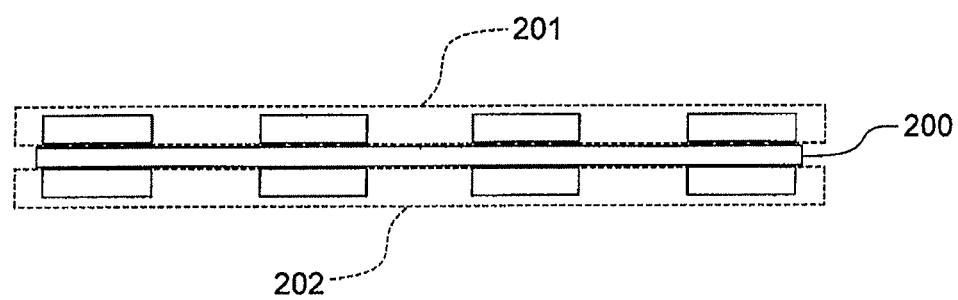
Figure 2C:
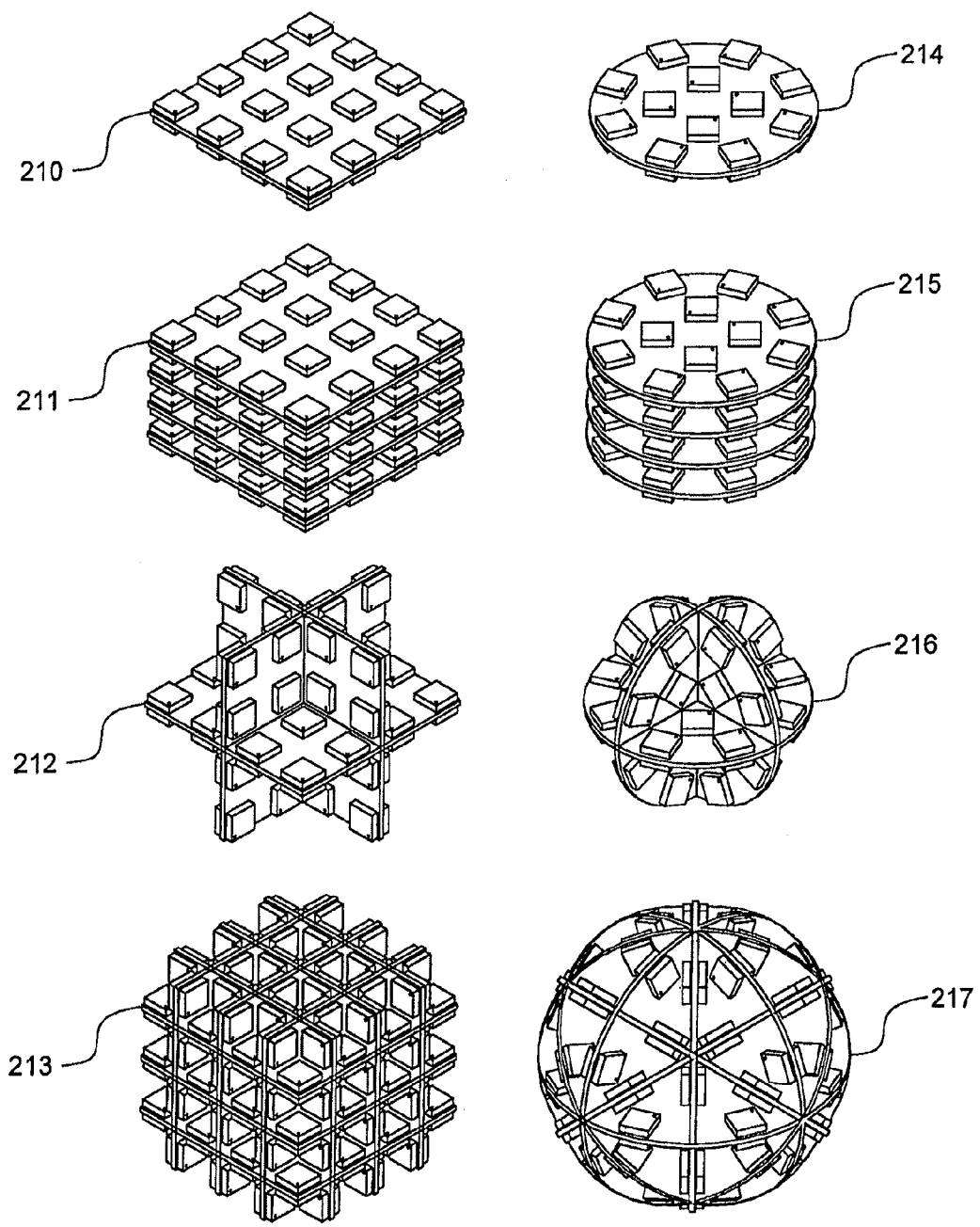
FIG. 2C depicts several embodiments of axis-reversed inertial sensor devices placed in an array.

Also included herein are embodiments where inertial sensor device pairs will be organized as a redundant inertial sensor array that include a plurality of redundancies for each axis of measurement. An example of such a system can be seen in FIG. 2A and FIG. 2B. In these figures, a first array of inertial sensor devices 201 is affixed to a first side of a substrate 200, and a second array of inertial sensor devices 202 is affixed to another side of the substrate so that each inertial sensor device on each side forms an axis reversed pair with an inertial sensor device from the other side. Thus, an inertially-induced measurement event will always be seen coherently by a plurality of inertial sensor devices within the sensor array. Drift or noise-induced measurement events will be detectable and filtered since these events probabilistically act in a non-coherent way. Inertial sensor devices also need not be homogeneous. Fusing data from an array of inertial sensor devices with varying slew-rate ranges and varying resonant structures/resonant frequencies can allow for the mean and covariance output of the aggregate estimation to achieve accuracies across a wider range of slew-rates while also rejecting vibration-induced structural-resonance noise. FIG. 2C illustrates examples of additional embodiments of this array. Embodiment 210 is the same array as in FIG. 2A and FIG. 2B, comprising 32 inertial sensor devices. Embodiment 211 is a stack of four of the array of 210, comprising total 128 inertial sensor devices. Embodiment 212 is three planes of 32 inertial sensor devices, placed so that each plane is orthogonal to the other two, comprising 96 total inertial sensor devices. Embodiment 213 is similar to the array of 212, but with nine planes of 32 inertial sensor devices, three planes on each axis, comprising 288 total inertial sensor devices. Embodiment 214 has inertial sensor devices mounted non-orthogonally on a circular substrate, comprising 24 inertial sensor devices. Embodiment 215 is a stack of four of the array of 214, comprising 96 total inertial sensor devices. Embodiment 216 is three planes of 24 inertial sensor devices, placed so that each plane is orthogonal to the other two, comprising 72 total inertial sensor devices. Embodiment 217 is similar to the array of 214, but with nine planes of 16 inertial sensor devices, placed so four of the arrays are parallel to each of the three axes, comprising 144 total inertial sensor devices.

Sensor Array Cross-Associating

Figure 7:
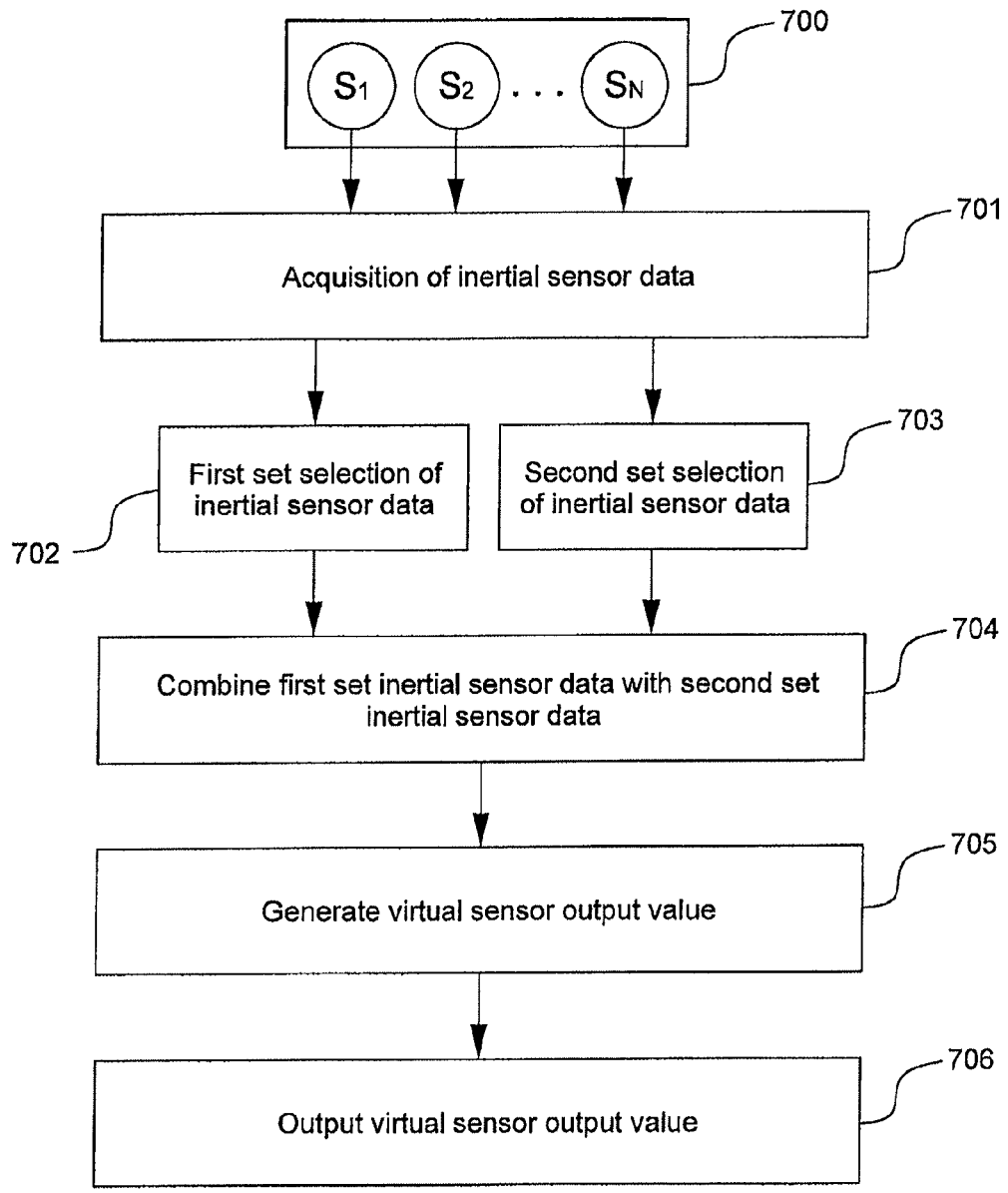
FIG. 7 depicts a flowchart of an embodiment of the combining of a first set of inertial sensor data with a second set of inertial sensor data to produce a virtual sensor output value.

FIG. 7 depicts a method of creating a plurality of virtual inertial sensors for determining an inertial quantity of a system. For each virtual sensor output value, Inertial sensor data 701 is acquired from a set of N inertial sensor devices 700, where N is a number of inertial sensor devices being measured. Data from a first set selection 702 and second set selection 703 of inertial sensor devices, chosen from the set of N inertial sensor devices, is combined 704 to generate a virtual sensor output value 705 which is output 706.

Figure 3:
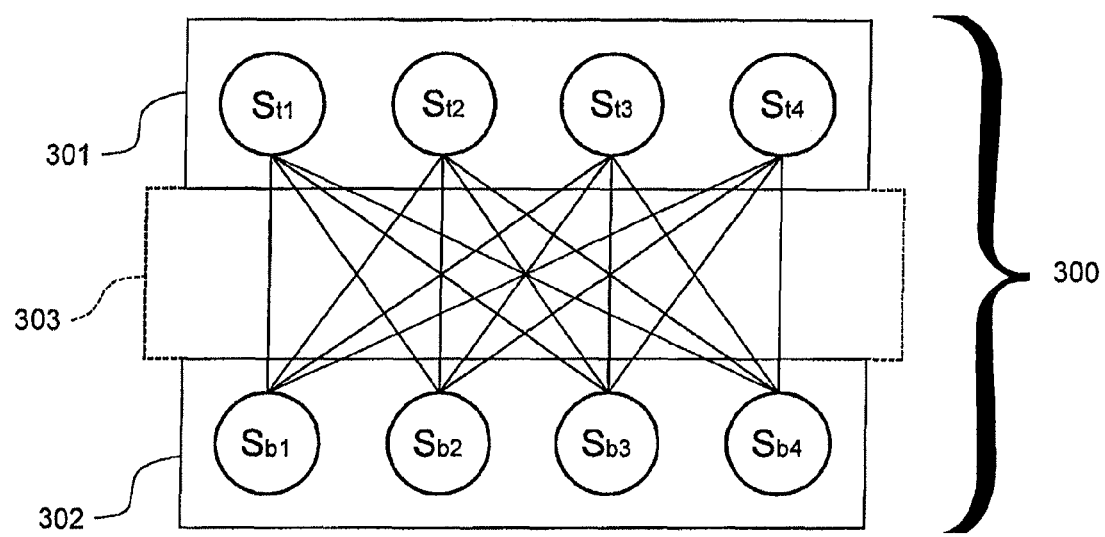
FIG. 3 depicts an embodiment of two groups of inertial sensor devices combined via cross-pairing to make virtual sensors.

Additionally, in some embodiments, the data from each inertial sensor device will be paired with the data of an inertial sensor device in the axis-reversed inertial sensor device set thus creating a set of differential "virtual" sensor output values. Thus, an array of N inertial sensor device pairs produces $N^2$ virtual sensor output values. The reason for this is three-fold: virtual sensor output values resulting from good sensor pairings are ensured, fault-tolerance is enhanced since as many as 2N-2 sensors may fail without impairing the system, and more virtual sensor output values are presented to the particle filter thus reducing effects of sample improverishment. Process 300 in FIG. 3 illustrates an inertial sensor device pair configuration where N, the number of inertial sensor device pairs, is 4. As illustrated in the example of FIG. 3, each inertial sensor device in array 301 is paired with each inertial sensor device in array 302 as displayed in the crossover graph 303, producing a virtual sensor array.

Hybrid Unscented Kalman/Particle Filter-Based Redundant Sensor Fusion

Figure 4:
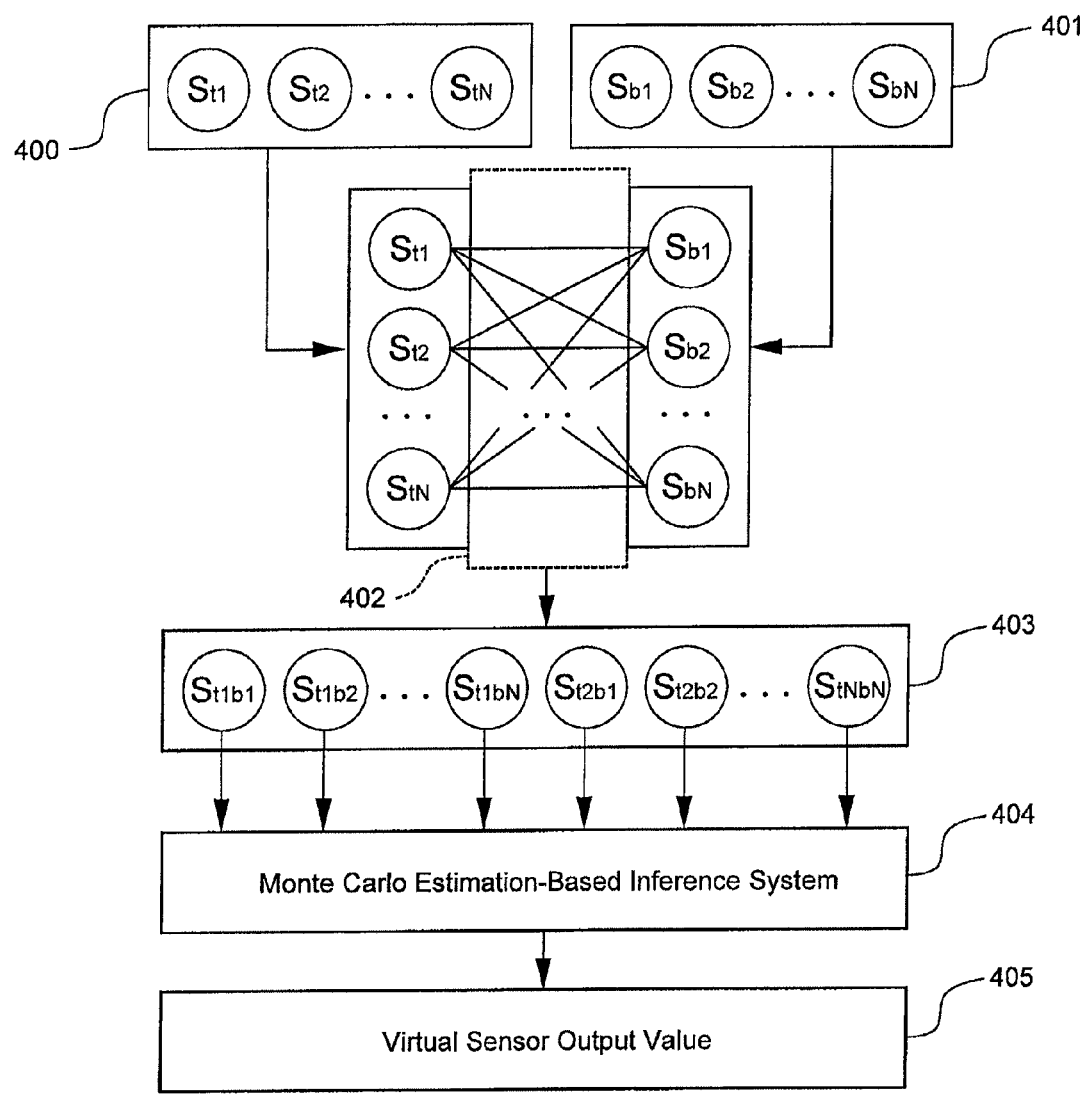
FIG. 4 depicts a flowchart of the execution of an embodiment of the overall system.

The use of a sensor array provides redundancy which allows cross-correlation and hence characterization of both base-signal characteristics and noise characteristics across the inertial sensor device array. Cross-correlation/sensor fusion is accomplished with a hybrid Unscented Kalman/Particle Filter or "Unscented Particle Filter" (UPF). The UPF technique incorporates an Unscented Kalman Filter (UKF) to generate proposal distributions that are then used by the particle filtering stage. This hybrid technique improves over non-hybrid optimal (Kalman filter) approaches by allowing problem domains that are non-linear and/or non-Gaussian, in addition to linear and Gaussian domains. The UPF also improves on generic particle filtering approaches since the use of the UKF allows the use of the most recent inertial sensor device data in the generation of the proposal distribution function. It should be noted that this filter could be any Monte Carlo estimation-based inference system, but we will present here an embodiment that implements the UPF. A general illustration of where this algorithm fits into the system as discussed so far is in FIG. 4. As illustrated in the example of FIG. 4, two inertial sensor device arrays, 400 and 401, are crossed as shown in 402 to produce virtual sensor array 403. Virtual sensor output values 403 are then used in Monte Carlo estimation-based inference system 404 to produce an estimated output 405.

Figure 5:
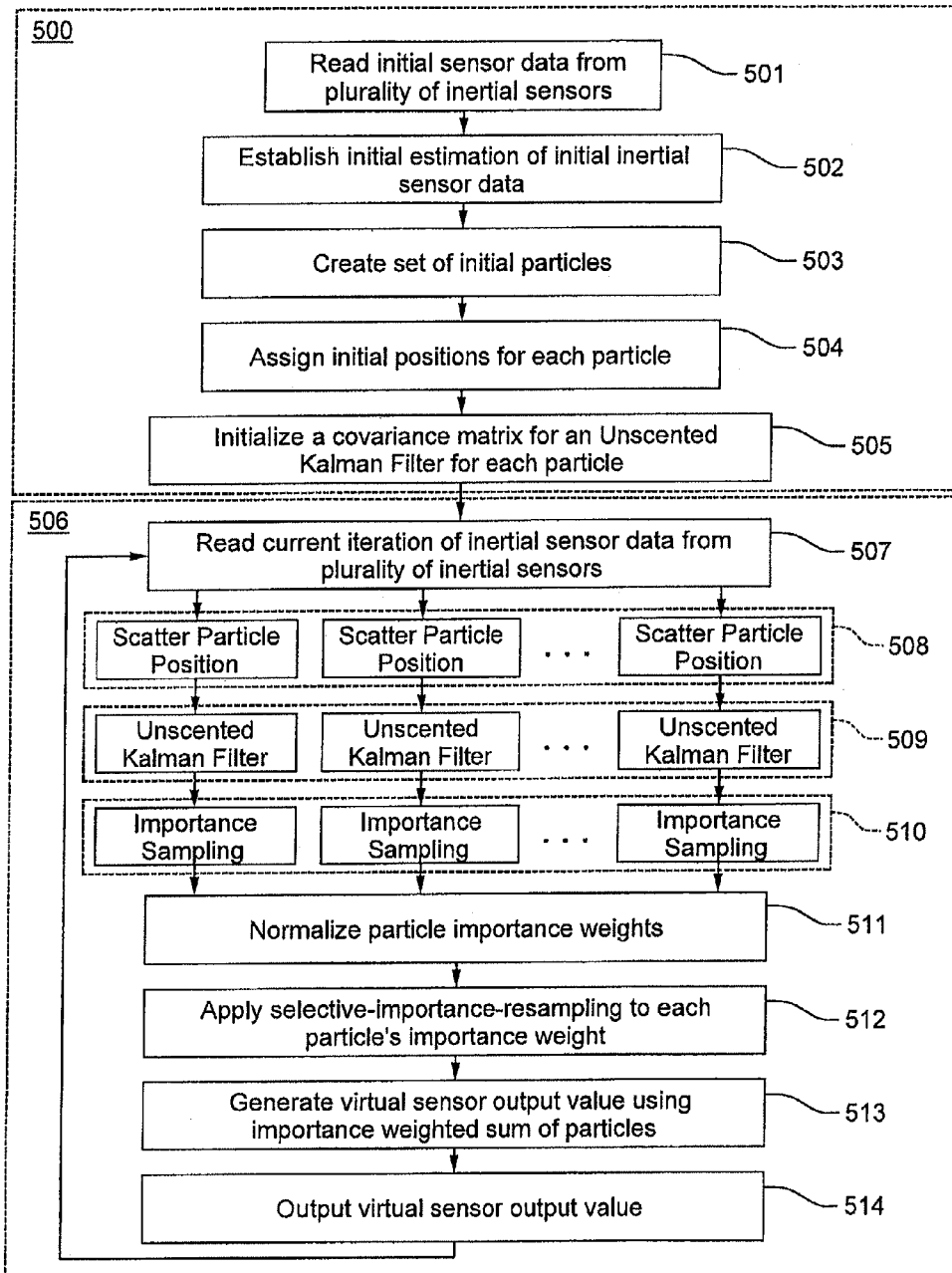
FIG. 5 depicts a flowchart of the execution of the Unscented Particle Filter algorithm as an embodiment of the Monte Carlo estimation-based inference system.

FIG. 5 illustrates the Unscented Particle Filter algorithm as an embodiment of the Monte Carlo estimation-based inference system, as further described in Algorithm Details. Specifically, block 505 depicts filter initialization and includes elements 500-505, and block 506 depicts the main loop of the process and includes elements 507-513. Some embodiments may include the following:

1. Reading initial inertial sensor data 501 from the plurality of inertial sensor devices.
2. Establishing an initial estimation of the initial inertial sensor data 502.
3. Creating a set of particles 503 and establishing a position for each particle 504 in the set of particles 502.
4. Initialize a covariance matrix for an Unscented Kalman Filter 505 for each particle.
5. Reading current iteration of inertial sensor data 507 from the plurality of inertial sensor devices.
6. Scattering particle positions 508 for each particle by adding noise to them according to a probability density function which may be determined experimentally or may be based on noise characteristics of the inertial sensor devices being used.
7. Use Unscented Kalman Filter 509 to update the position for each particle further by way of prediction.
8. Performing importance sampling 510 by assigning a weight to each particle based on the probability of the current iteration of inertial sensor data given that this particle's position is treated as a sensor data element.

9. Normalizing the importance weights 511 of all particles with respect to the total of all particle importance weights.
10. Applying selective-importance-resampling 512 to the particles to adjust each particle's importance weighting by comparing each particle to the set of sensor data obtained from the plurality of inertial sensor devices.
11. Generating the virtual sensor output value using an importance weighted sum 513 of the particles.
12. Outputting the virtual sensor output value 514 as a tangible indication of the inertial quantity.

This process provides a mechanism for the sensors to collectively detect coherent (inertial) events while rejecting non-coherent (drift/noise) events. Thus, with many inertial sensor devices, individual inertial sensor device process/measurement errors and inertial sensor device failures need not affect the reliability of the generalized output. The importance-resampling process ensures that good inertial sensor device pairings are given elevated importance weightings while poor inertial sensor device pairings are given reduced importance.

Furthermore, embodiments disclosed herein can easily be scaled to the desired level of accuracy by increasing the amount of redundancy. Within a given system this scaling can be performed dynamically thus allowing a system that can be dynamically adjusted for accuracy/reliability vs. power consumption/responsiveness.

Particle filtering methods also lend themselves well to distributed or parallel processing and can thus be made to perform well in multi-processing/distributed environments.

In this way, individual inertial sensor device drift and noise characteristics are compensated for by giving more weighting to inertial sensor devices that are more accurate, and inertial sensor devices that are less significant (or have failed) receive a less significant (or zero) weighting. This form of confidence-based redundant unscented particle filter-based sensor fusion allows an ultra low-drift, low-noise output to be produced from an array of inherently unreliable and/or inaccurate inertial sensor devices.

Algorithm Details
The Sensor Pairing Algorithm:

In the following, $S_t$ refers to inertial sensor devices mounted on a first side (normal non-axis inverted, hereinafter referred to as "top") of a substrate. $S_b$ refers to inertial sensor devices mounted on another side (axis-inverted, hereinafter referred to as "bottom") of the substrate. $S_v$ refers to virtual sensor output values formed by taking the difference between a non-axis-inverted and an axis-inverted inertial sensor device pair divided by two, and y0 refers to the initial virtual sensor output value vector.

1. Get initial measurement from each top and bottom inertial sensor device to form vectors $S_t = [S_{t1}, S_{t2}, \ldots, S_{tN}]$ and $S_b = [S_{b1}, S_{b2}, \ldots, S_{bN}]$ respectively. These measurements may undergo normalization and/or additional processing.
2. Create virtual inertial sensors for up to $N^2$ top and bottom pair combinations to form a virtual inertial sensor output value vector $S_v = [(S_{t1}-S_{b1})/2, (S_{t1}-S_{b2})/2, \ldots, (S_{tN}-S_{bN})/2]$.

The Filtering Algorithm:

In the following, $x_k$ is the actual inertial sensor device data at time k, $\hat{x}_k$ is the estimated inertial sensor device data at time k, $w_k$ is a random sequence that represents process noise, $y_k$ is a vector of the measurements from each inertial sensor device at time k, and $v_k$ is a random sequence that represents measurement noise. The noise vectors are independent white noise processes with known probability density functions. $w_k$ has covariance $Q_k$, and $v_k$ has covariance $R_k$. This algorithm works by comparing a set of randomly placed particles to readings taken from the inertial sensor devices in order to attempt to determine the true probability density function of the inertial sensor device data. Kalman filters are used to make the random placement correspond more closely to values that would come from the inertial sensor devices.

FIG. 5, and the corresponding description, below, further illustrates this process. More specifically, block 500 depicts initialization of the process and includes elements 500-505, and block 506 depicts the main loop of the process and includes elements 507-514.

Initialization (Block 500):
1. Element 501:
   Get initial measurement from each of N virtual sensors in $S_v$ to form vector $y0 = S_v^T$, which can be written as $[y0_1, y0_2, \ldots, y0_N]^T$. These measurements may undergo additional preprocessing.
2. Element 502:
   Set
   $$\hat{x}_0 = \frac{1}{N} \sum_{i=1}^{N} y0_i.$$
3. Elements 503, 504 and 505:
   For $i=1, 2, \ldots, M$, where M is the number of particles being used, let $x_{0,i}^{post*}$ be a 1 component vector consisting of $\hat{x}_0$, and let $P_{0,i}$ be a $1 \times 1$ matrix consisting of the variance of y0. These will serve as the initial position for each particle and the initial covariance matrix for each Kalman filter, respectively.

Main Loop (Block 506):
1. For time periods $k=1, 2, \ldots$ do:
A. Sensor Read, Element 507:
   Get measurement from each of N virtual sensors as determined by the sensor-pairing algorithm at time k to form vector $y_k$.
B. Particle Scattering, Element 508:
   For $i=1, 2, \ldots, M$, set $x_{k,i}^{pre} = x_{k-1,i}^{post*} + w_{k-1,i}$ where $w_{k-1,i}$ is a noise value generated according to the probability density function of $w_{k-1}$. This gives each particle a random position near its previous position.
C. Unscented Kalman Filter, Element 509:
   For $i=1, 2, \ldots, M$, update $x_{k,i}^{pre}$ to $x_{k,i}^{post}$:
   i. Time Update:
      a) Set $x_{k,i}^a = [x_{k,i}^{pre} E[w_k]^T]^T$. This forms an augmented state for use by the Unscented transform by adding information about process noise. Note that if the process noise is additive,
      b) Set
      $$P_{k,i}^a = \begin{bmatrix} P_{k-1,i} & 0 \\ 0 & Q_k \end{bmatrix}.$$
      This forms an augmented covariance matrix for use by the Unscented transform.
      c) Set $\tilde{x}^{(0)} = x_{k,i}^a$. This and (d) and (e) which follow form the sigma points for the Unscented transform, which it then uses to get variance information about the underlying data, regardless of its linearity.
      d) Set $\tilde{x}^{(1)} = x_{k,i}^a + (\sqrt{P_{k,i}^a})_i^T$ where $(\sqrt{P_{k,i}^a})_i^T$ is the ith column of the matrix square root of $P_{k,i}^a$.
      e) Set $\tilde{x}^{(2)} = x_{k,i}^a - (\sqrt{P_{k,i}^a})_i^T$.

f) For j=0, 1, 2, set $\tilde{x}_k^{(j)}=f(\tilde{x}^{(j)})$. f is a function that predicts the next state given a state. For example, in a system where state was angular position and angular rate, this would add rate to position. This function is determined by the properties of the inertial sensor devices used, the sampling process, and the physical system.

g) Set $$\hat{x}_k^{pre} = \sum_{j=0}^{2} W_s^j \tilde{x}_k^{(j)}, \text{ where } W_s^0 = \frac{\lambda}{1+\lambda} \text{ and } W_s^j = \frac{1}{2(1+\lambda)}.$$

Where $\lambda=\alpha^2(1+\kappa)-1$, and $\alpha$ and $\kappa$ are scaling factors that control the spread of the sigma points. Usual values for these are $\alpha=10^{-3}$ and $\kappa=0$, though the values may be determined experimentally for a given system as used in a given domain. This computation and the one following it update the Kalman filter using the sigma points and weights of the Unscented transform.

h) Set $$P_k^{pre} = \sum_{j=0}^{2} W_c^j (\hat{x}_k^{(j)} - \hat{x}_k^{pre})(\hat{x}_k^{(j)} - \hat{x}_k^{pre})^T.$$

where $W_c^0 = \frac{\lambda}{1+\lambda} + (1 - \alpha^2 + \beta)$ and $W_c^j = \frac{1}{2(1+\lambda)}$.

The value $\beta$ controls the weighting of the $0^{th}$ sigma point. $\beta=2$ is optimal if x is Gaussian. As with $\alpha$ and $\kappa$, the best value for this may be determined experimentally.

ii. Measurement Update:
a) Set $x_{k,i}^a=[\hat{x}_k^{pre}E[v_k]^T]^T$. We form new augmented data, this time with the measurement noise data. As above, this may not need to be augmented if the noise is additive. The covariance will still need to be augmented regardless.

b) Set $$P_{k,i}^a = \begin{bmatrix} P_k^{pre} & 0 \\ 0 & R_k \end{bmatrix}.$$

c) Set $\tilde{x}^{(0)}=x_{k,i}^a$. We form another set of sigma points.
d) Set $\tilde{x}^{(1)}=x_{k,i}^a+(\sqrt{P_{k,i}^a})^T_i$.
e) Set $\tilde{x}^{(2)}=x_{k,i}^a-(\sqrt{P_{k,i}^a})^T_i$.
f) For j=0, 1, 2, set $\hat{y}_k^{(j)}=h(\tilde{x}_k^{(j)})$. h is a function that predicts the next measurement given a state. In a system where state was angular position and angular rate but only position was measured, this would strip out rate and just return position. This function is determined by the properties of the inertial sensor devices use, the sampling process, and the physical system.

g) Set $$\hat{y}_k = \sum_{j=0}^{2} W_s^j \hat{y}_k^{(j)}.$$

This computation and the two following prepare values for the Kalman filter based on the Unscented transform.

h) Set $$P_y = \sum_{j=0}^{2} W_c^j (\hat{y}_k^{(j)} - \hat{y}_k)(\hat{y}_k^{(j)} - \hat{y}_k)^T.$$

i) Set $$P_{xy} = \sum_{j=0}^{2} W_c^j (\hat{x}_k^{(j)} - \hat{x}_k^{pre})(\hat{y}_k^{(j)} - \hat{y}_k)^T.$$

j) Set $K_k=P_{xy}P_y^{-1}$. Determine the Kalman gain.
k) Set $x_{k,i}^{post}=\hat{x}_k^{pre}+K_k(y_k-\hat{y}_k)$. Determine the final state for this time period.
l) Set $P_{k,i}=P_k^{pre}+K_kP_yK_k^T$. Determine the final covariance for this time period.

D. Importance Sampling, Element 510:
Evaluate the probability density function $p(y_k|x_{k,i}^{post})$ based on the measurement equation and the probability density function of the measurement noise to compute the relative likelihood of $q_i$ each particle $x_{k,i}^{post}$. In other words, determine how likely we are to get the actual inertial sensor device data we did if this particle's position represented a sensor dated element.

E. Normalization, Element 511:
Set $$q_i = \frac{q_i}{\sum_{j=1}^{N} q_j}.$$

In other words, normalize the weights so they sum to 1.

F. Resampling, Element 512:
For i=1, 2, ..., M, do:
  i. Generate a random number r uniformly distributed on [0,1].
  ii. Calculate the smallest t such that $$\sum_{p=1}^{t} q_p \geq r.$$

iii. Set $x_{k,i}^{post*}=x_{k,t}^{post}$
       (Resampling essentially causes each new particle to choose from among the current particles, in a weighted fashion, a parent. Each particle's position becomes that of its parent.)

G. Prediction, Element 513:
Calculate the estimated physical quantity $$\hat{x}_k = \frac{1}{N}\sum_{i=1}^{N} x_{k,i}^{post*} \approx E(x_k | y_k).$$

Note that instead of being done this way, this might also be done by taking a weighted sum of the particles before the resampling (Element 512) is performed.

The method that is best for a given problem domain may be determined experimentally.

H. Element 514:

Output the estimated inertial quantity $\hat{x}_k$.

It should also be noted that elements 508, 509, and 510 may be performed in parallel for each particle, so as to distribute the work that must be done.

There are many variations one could make to the content laid out in this description. It is to be understood that those are still to be considered as being part of this description, and that the removal of presented elements or addition of new elements to what was presented is still meant to be covered by this description.

All words used in this document to describe the method which has been described are meant not just to mean what they commonly mean, but also to include any other meanings which they may be understood as having in the context of this document.

I claim:

1. A method of determining an inertial quantity in a system with linear, non-linear, Gaussian, or non-Gaussian characteristics or combinations thereof, the method comprising:

associating a plurality of inertial sensor devices with the system;

acquiring inertial sensor data from the plurality of inertial sensor devices;

utilizing a computing device for processing the inertial sensor data by application of a Monte Carlo estimation-based inference system configured to produce estimates in systems with linear, non-linear, Gaussian, and non-Gaussian characteristics, wherein:

the Monte Carlo estimation-based inference system is selected from a set of Monte Carlo estimation-based inference systems based on a set of operating and performance characteristic criteria; and the computing device produces a virtual connection between at least two of the plurality of inertial sensor devices, resulting in a virtual sensor output value, the virtual sensor output value being of a degree of accuracy exceeding that which would otherwise be attributable to one of the single inertial sensor devices; and utilizing the virtual sensor output value as at least part of a tangible indication of the inertial quantity.

2. The method of claim 1, wherein the Monte Carlo estimation-based inference system comprises an Unscented Particle Filter, incorporating an Unscented Kalman Filter to perform predictions of time updates and measurement updates for each particle.

3. The method of claim 1, wherein the computing device comprises a firmware controlled digital processor, a programmed portion of a digital software controlled computer, a logic circuit, or an application-specific integrated circuit for performing the recited function.

4. The method of claim 1, wherein the Monte Carlo estimation-based inference system is an Unscented Particle Filter, configured to perform the following:

read initial inertial sensor data from the plurality of inertial sensor devices;

establish an initial estimation of the initial inertial sensor data;

create a set of particles and establishing a position for each particle in the set of particles;

initialize a covariance matrix for an Unscented Kalman Filter for each particle;

execute an Unscented Particle Filter update process at least one time, comprising:

read current iteration of inertial sensor data from the plurality of inertial sensor devices;

scatter particle positions for each particle by adding noise to them according to a probability density function which may be determined experimentally or may be based on noise characteristics of the inertial sensor devices being used;

use an Unscented Kalman Filter to update the position for each particle further by way of prediction;

perform an importance sampling by assigning a weight to each particle based on the probability of the current iteration of inertial sensor data given that this particle's position is treated as a sensor data element;

normalize the importance weights of all particles with respect to the total of all particle importance weights:

apply selective-importance-resampling to the particles to adjust each particle's importance weighting by comparing each particle to the set of inertial sensor data obtained from the plurality of inertial sensor devices;

generate the virtual sensor output value using an importance weighted sum of the particles; and output the virtual sensor output value as a tangible indication of the inertial quantity.

5. The method of claim 1, in which the Monte Carlo estimation-based inference system is a Particle Filter, Sampling Importance Resampling Filter, Auxiliary Particle Filter, Extended Kalman Particle Filter, Condensation Particle Filter, Ensemble Kalman Filter, or Markov Chain Monte Carlo process.

6. The method of claim 1, wherein each individual inertial sensor device of the plurality of inertial sensor devices is an angular rate sensor device.

7. The method of claim 6, wherein each angular rate sensor device is a MEMS-based device.

8. The method of claim 6, wherein each angular rate sensor device is a non-MEMS-based device.

9. The method of claim 1, wherein the plurality of inertial sensor devices is configured as one or more axis-reverse pairs of angular rate sensor devices positioned on the substrate.

10. The method of claim 9, wherein the plurality of angular rate sensor devices is configured as one or more axis-reverse pairs of angular rate sensor devices positioned on the substrate.

* * * * *